US010096160B2

(12) United States Patent
Choi

(10) Patent No.: US 10,096,160 B2
(45) Date of Patent: Oct. 9, 2018

(54) VIRTUAL REALITY (VR) SPORTS PUB SYSTEM

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 15/662,746

(22) Filed: Jul. 28, 2017

(65) Prior Publication Data

US 2018/0047210 A1   Feb. 15, 2018

(30) Foreign Application Priority Data

Aug. 11, 2016 (KR) .................. 10-2016-0102099

(51) Int. Cl.
| | |
|---|---|
| *G06F 19/00* | (2018.01) |
| *G06T 19/00* | (2011.01) |
| *A63F 13/335* | (2014.01) |
| *H04N 13/366* | (2018.01) |
| *E04H 3/22* | (2006.01) |

(52) U.S. Cl.
CPC .......... *G06T 19/003* (2013.01); *A63F 13/335* (2014.09); *E04H 3/22* (2013.01); *G06T 19/00* (2013.01); *H04N 13/366* (2018.05); *G06T 2210/04* (2013.01)

(58) Field of Classification Search
None
See application file for complete search history.

(56) References Cited

U.S. PATENT DOCUMENTS

| | | | | |
|---|---|---|---|---|
| 3,225,652 A | * | 12/1965 | Sauppe .................. | G03B 23/00 353/107 |
| 3,541,742 A | * | 11/1970 | Harper ..................... | A47C 1/12 297/232 |
| 4,874,162 A | * | 10/1989 | Trumbull ............... | A63G 31/16 352/85 |
| 4,885,878 A | * | 12/1989 | Wuu ....................... | E04H 3/126 348/121 |
| 5,433,670 A | * | 7/1995 | Trumbull ............... | A63G 31/16 352/85 |
| 5,469,669 A | * | 11/1995 | Alter ........................ | E04H 3/22 52/6 |
| 5,577,350 A | * | 11/1996 | Brisbin ................... | E04B 7/163 52/6 |
| 5,673,145 A | * | 9/1997 | Wilson .................... | G03B 21/02 348/E5.144 |
| 5,746,599 A | * | 5/1998 | Lechner .................. | G06T 3/403 348/123 |

(Continued)

*Primary Examiner* — Paul A D'Agostino
(74) *Attorney, Agent, or Firm* — Bacon & Thomas, PLLC

(57) ABSTRACT

A screen structure including the first, second, and third screens, and a hall structure in which a table, a chair, a staircase, and a serving passage are configured in one structure. Multiple tables and chairs are disposed in one viewing direction of the first screen on a front and each table and chair are configured in each staircase structure, the serving passage is configured on a front end of each table, the first screen is provided on the front of the viewing direction of the multiple tables, and the second and third screens are configured in left and right directions of the multiple tables, respectively and a screen size is configured so that a horizontal viewing angle is 180° or more and a vertical viewing angle is 100° or more, including a local illumination that limitedly illuminates the top of the table at an upper end.

10 Claims, 6 Drawing Sheets

(56) References Cited

U.S. PATENT DOCUMENTS

| | | | | |
|---|---|---|---|---|
| 5,822,928 A * | 10/1998 | Maxwell | E04H 3/22 | 52/6 |
| 5,829,201 A * | 11/1998 | Schelter | A47C 1/124 | 414/921 |
| 5,964,064 A * | 10/1999 | Goddard | A63J 5/021 | 352/43 |
| 6,099,129 A * | 8/2000 | Hayashi | G03B 17/53 | 353/122 |
| 6,253,494 B1 * | 7/2001 | Shaffron | E04H 3/22 | 52/64 |
| 6,293,052 B1 * | 9/2001 | Varnado, Jr. | E04H 3/10 | 52/7 |
| 6,407,798 B2 * | 6/2002 | Graves | G03B 21/56 | 352/69 |
| 6,646,800 B2 * | 11/2003 | Choi | G03B 21/56 | 352/69 |
| 6,865,023 B2 * | 3/2005 | Shafer | G09F 19/18 | 353/122 |
| 6,909,543 B2 * | 6/2005 | Lantz | G03B 21/00 | 348/36 |
| 7,583,437 B2 * | 9/2009 | Lipton | G03B 21/56 | 359/451 |
| 7,911,580 B2 * | 3/2011 | Read | E04H 3/22 | 352/11 |
| 7,980,858 B2 * | 7/2011 | Valoe | A47B 39/00 | 434/432 |
| 8,313,199 B2 * | 11/2012 | Hirata | G02B 17/08 | 353/94 |
| 8,348,675 B2 * | 1/2013 | Dohrmann | G09B 5/00 | 434/326 |
| 8,714,746 B2 * | 5/2014 | Choi | E04H 3/22 | 352/70 |
| 8,797,377 B2 * | 8/2014 | Mauchly | H04N 7/15 | 348/14.08 |
| 9,523,209 B2 * | 12/2016 | de Lespinois | E04B 1/346 | |
| 9,664,994 B1 * | 5/2017 | Small | G03B 21/565 | |
| 9,797,151 B2 * | 10/2017 | Salient Puigcercos | E04H 3/30 | |
| 2002/0131018 A1 * | 9/2002 | Lucas | G03B 21/56 | 352/85 |
| 2002/0135739 A1 * | 9/2002 | Standard | E04H 3/22 | 353/46 |
| 2002/0149239 A1 * | 10/2002 | Koljonen | A47C 7/72 | 297/184.14 |
| 2003/0086574 A1 * | 5/2003 | Higgs | H04R 27/00 | 381/77 |
| 2003/0171142 A1 * | 9/2003 | Kaji | A63F 1/02 | 463/11 |
| 2003/0174292 A1 * | 9/2003 | White | G03B 15/10 | 353/74 |
| 2007/0188712 A1 * | 8/2007 | Kutner | E04H 3/22 | 353/15 |
| 2011/0170074 A1 * | 7/2011 | Ferren | G03B 21/56 | 353/94 |
| 2012/0247030 A1 * | 10/2012 | Magpuri | E04H 3/22 | 52/6 |
| 2013/0050578 A1 * | 2/2013 | Choi | H04N 9/3147 | 348/565 |
| 2014/0225404 A1 * | 8/2014 | Ramirez Magana | A47C 1/12 | 297/248 |
| 2014/0235362 A1 * | 8/2014 | Fox | H04R 1/02 | 472/75 |

* cited by examiner

VIRTUAL REALITY (VR) SPORTS PUB SYSTEM

CROSS-REFERENCE TO RELATED APPLICATION(S)

This application claims benefit of priority to Korean Patent Application No. 10-2016-0102099 filed on Aug. 11, 2016 with the Korean Intellectual Property Office, the disclosure of which is incorporated herein by reference in its entirety.

BACKGROUND OF THE INVENTION

The present invention relates to a sports pub structure, and more particularly, to a virtual reality sports pub system having a structure in which a structure of a screen having a viewing angle of a virtual reality image as if sports broadcasting is performed in a scene stadium and a hall structure are combined to frequently receive a serving such as drinks while enjoying the virtual reality image.

DESCRIPTION OF RELATED ART

A sports pub is a place where sports can be enjoined through a screen image by drinking beverages such as beer and a 40" TV screen is watched at a distance of 2 M or more and in this case, the screen is very small due to a viewing angle less than 20° on both sides, and as a result, a sense of presence which a viewer feels is very short.

For this reason, it is attempted to broadcast sports images using virtual reality images for the sense of presence. However, this does not provide panoramic sports images such as actual stadiums, which are mainly viewed through a head mounted display (HMD) device.

In general, left and right viewing angles provided in the existing sports bars and theaters are less than 40° and upper and lower heights are also about 20°. However, when a viewer actually watches a sports game on a playground, the maximum left and right viewing angles are 80 to 120° and when the viewer turns his or her head to the left and right, the left and right viewing angles of approximately 40 to 60° are added, the actual left and right maximum viewing angles are approximately 120 to 180°.

In view of a fact that a ratio of an HD screen broadcasted and transmitted at present is 16:9, a vertical viewing angle relative to a horizontal viewing angle of 120° is 67.5°.

Therefore, minimum horizontal and vertical viewing angle of a virtual reality screen in which sports relay broadcasting is mainly performed needs to be implemented as 120° or more and 67° or more.

Meanwhile, the virtual reality image is projected mainly through a projector and in the projected image, as the screen becomes larger, a projected light amount is diffused and brightness rapidly deteriorates, and as a result, a whole surrounding illumination needs to be dark for definition.

Therefore, when a game starts, an orderer may not be actually identified, and as a result, an ordering action may not be performed and there is a structure in which customers in front of a large screen densely view the screen in order to secure the viewing angle of the screen, there is a danger of a safety accident without a movement space and serving is not also easy.

As a result, when the game starts, an order actually stops and there are many examples in which installation of the large screen in most sports pubs acts as a factor of hindering sales.

SUMMARY OF THE INVENTION

The present invention has been made in an effort to provide a sports pub system having a structure to frequently receive a serving at a seat position of a customer while providing a virtual reality image effect of a wide viewing angle as seen in an actual stadium on a screen.

The present invention is configured by combining a screen structure constituted by first, second, and third screens with a hall structure in which a table, a chair, a staircase, and a serving passage are combined and configured in one structure.

Multiple tables and chairs are disposed in a first screen direction in which the tables and chairs are installed on a front as a main viewing direction and the first screen is provided on the front of the viewing direction of the multiple tables, and the second and third screens are configured in left and right directions of the multiple tables, respectively and a screen size and a seat layout are configured so that a horizontal viewing angle is 100° or more and a vertical viewing angle is 100° or more.

Each table and chair are configured in a staircase structure and the serving passage is configured at a front end of each of the multiple tables.

The structure of the first, second, and third screens are configured in a polygonal shape and the table and screen structures in the hall are configured in a symmetric structure in both front and rear directions to provide an image having a horizontal viewing angle of 360°.

Accordingly, provided is a VR sports bar having a structure in which the first, second and third screens and the serving passages are combined.

As described above, first, second, and third screens provided on front surfaces, and in left and right directions of multiple tables provide a horizontal viewing angle of 200 to 360°.

Viewing angles of tables disposed in a staircase structure and a viewer of a chair provide a viewing angle equal or larger than a vertical viewing angle 60°.

A local illumination provided for each table frequently enables a serving for an order of a customer through a serving passage configured at a front end of each table while providing an illumination which enables the customer to safely and freely move while maintaining definition of the screen.

Therefore, the customer can get virtual reality visual effects of a wide viewing angle as in a sports stadium and can serve from time to time by using a service channel, so that a marketing purpose of a theater type restaurant structure simultaneously providing a sports pub or movie and food at the same time can be simultaneously achieved.

BRIEF DESCRIPTION OF DRAWINGS

The above and other aspects, features, and advantages of will not be described in detail in reference to certain exemplary embodiments thereof illustrated by the accompanying drawings which are given hereinbelow by way of illustration only, and thus are not limitative of the present invention, in which.

DETAILED DESCRIPTION OF THE INVENTION

Figure 1:
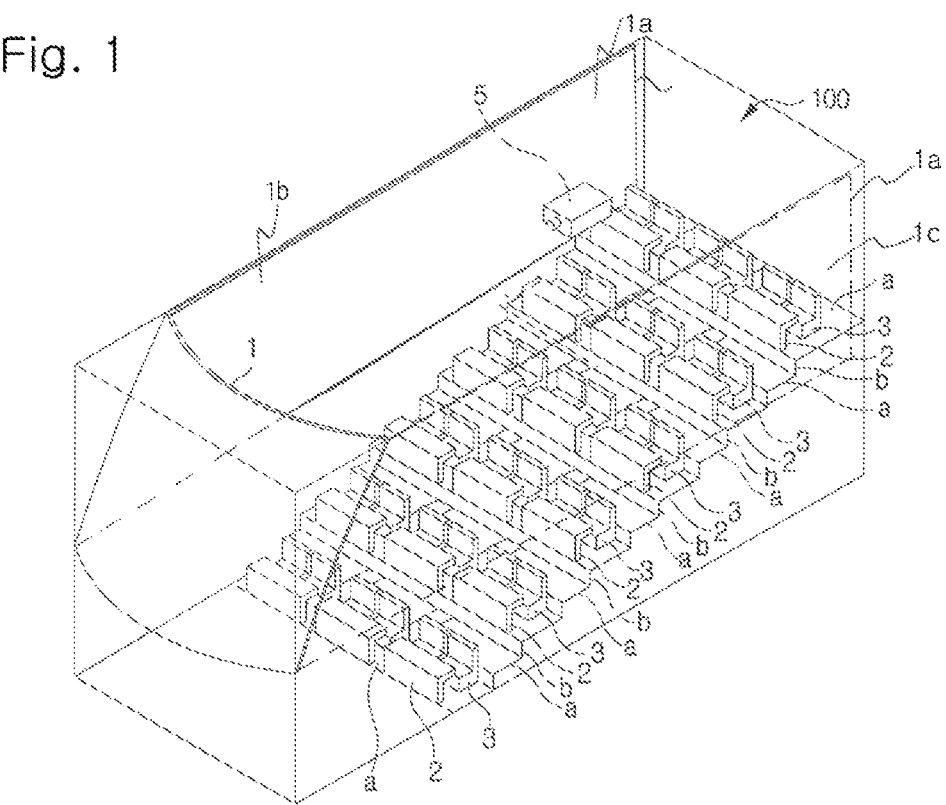
FIG. 1 illustrates a configuration exemplary embodiment of the present invention.

The present invention has been made in an effort to configure a structure of a virtual reality sports pub which may receive a serving such as beverage to each table while providing a virtual reality effect of a stadium by configuring a screen structure to a visual effect such as a playground by configuring the screen structure of the first, second, and third screens with one image system and configuring a table, a chair, a staircase, and a serving passage as one structure and combining the structure with the screen structure.

This will be described in detail with reference to drawings.

A virtual reality sports pub system includes: a first screen 1, and second and third screens 1b and 1c provided on a front surface, and left and right sides in a hall 100; a chair 3 and a table 2 disposed toward the first screen 1; and a serving passage a configured at a front end or left and right sides of the chair 3 and the table 2, and a serving may be provided for each table 2 through the serving passage a while providing an image having a horizontal viewing angle of 100° of the screen 1 or more based on the table 2 at a first column toward the first screen 1.

Further, the chair 3, the table structure 2, and the serving passage a are configured in a structure of one staircase b.

The structure of the first, second, and third screens 1, 1b, and 1c is partitioned into 3 to be configured as one U-shaped screen structure with a curved screen provided on the front surface and plane screens at the left and right sides.

Further, the structure of the first, second, and third screens 1, 1b, and 1c is configured as one structure of an LED, an LCD, an OLED, a micro LED, a flexible display, and a display displaying an image itself through self-emission.

In addition, the screen, chair, table, and serving passage structures are configured in a both front and rear direction symmetric structure to provide the serving for each table while providing an image of 200° or more at front, rear, and left, and right sides.

Figure 2:
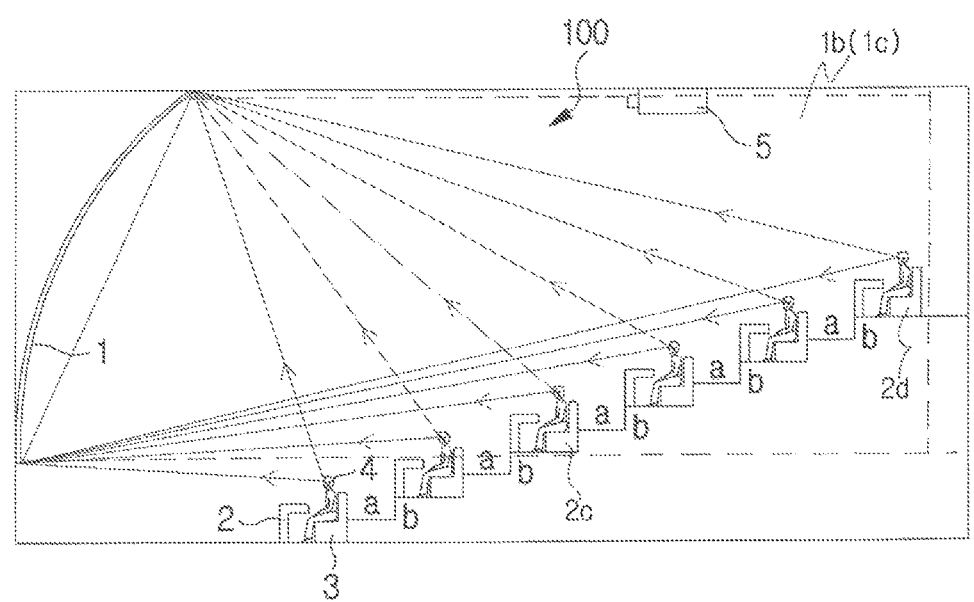
FIG. 2 is a side configuration explanatory diagram.

In order to achieve such an object, as illustrated in FIGS. 1, 2, and 3, the screen 1 structure of the first, second, and third screens is configured as a screen structure showing a visual effect such as a playground in a hall 100 and the table, the chair 3, the staircase b, and the serving passage a are configured as one hall 100 internal structure.

In order to provide the virtual reality effect of the stadium, multiple tables 2 and chairs 3 are disposed in one viewing direction and each table and chair 3 are configured in the structure of the staircase b, the serving passage a is configured at a front end of each table 2, a local illumination 6 is provided on the top of the table 2 and the serving passage a, the first screen 1 is provided on the front surface of the viewing direction of the table 2, and the second and third screens 1b and 1c are configured in both the left and right directions of the multiple tables 2, respectively to configure a structure to provide the serving for each table 2 with viewing angles of 100 to 180° based on the horizontal viewing angle of 120° and 40 to 80° based on the vertical viewing angle of 60° in three directions of front, left and right directions based on the viewing direction of the table 2.

That is, one viewing angle in the range of 100 to 180° is recommended based on the horizontal viewing angle of 120° and the viewing angle is not limited but recommended in the range of 40 to 80° is recommended based on the vertical viewing angle of 60.

This will be described below in detail with reference to the illustrated drawings. A virtual reality actually provides the viewing angle as seen in a stadium scene and the viewing angle of a viewer which views the stadium is generally horizontally 100 to 120° and herein, when the left and right sides are viewed by turning a head, approximately 60° is extended, and as a result, a minimum of 120° is recommended as the horizontal viewing angle for the sense of presence.

Since a horizontal and vertical screen ratio of a transmitted broadcasting screen is 16:9, when the horizontal and vertical screen ratio is converted, 60° or more is recommended as the vertical viewing angle.

A playground image in a viewing angle range is transmitted and the horizontal viewing angle of 120° or more and the vertical viewing angle of 60° or more are provided in all chairs 3 in the hall 100.

Securing the virtual reality image having the horizontal viewing angle of 120° or more is determined by the configuration of the first, second, and third screens 1, 1a, and 1b and a layout of the chair 3.

A space height of a building to which a sports pub is adjacent is generally in the range of 2.5 to 6 m. A sitting height of a customer at a first-column seat is generally 1.6 m based on the screen. A height acquired by excluding the customer's sitting key of 1.6 m from the building space height in the range of 2.5 to 6 m is in the range of 0.9 to 3.4 m.

When the space height is converted into the horizontal and vertical ratio screen ratio of 16:9, a horizontal installable screen length is in the range of 1.6 to 6 m, therefore, a whole size of the screen is in the range of 0.9 m×4.8 m to 3.4 m×18 m as width and length sizes according to a place.

The screen having such a size is arranged and configured as below.

Figure 3A:
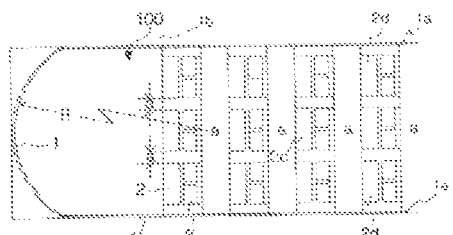
FIG. 3A is an explanatory diagram of a configuration exemplary embodiment of a curve screen.

As illustrated in FIG. 3A, the first screen 1 is configured on the front surface in the hall 100 in a curve and the left and right screens 1b and 1c are configured in a plane.

Figure 3B:
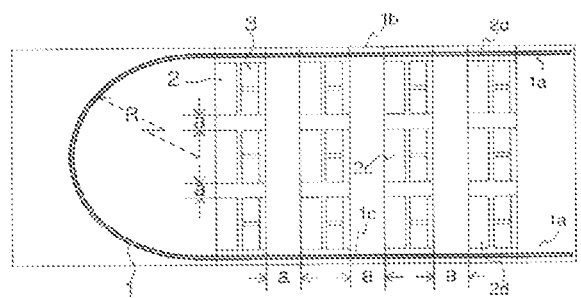
FIG. 3B is an explanatory diagram of a configuration exemplary embodiment of a U-shaped screen.

As illustrated in FIG. 3B, the first, second, and third screens 1, 1b, and 1c are configured in a U shape based on the front surface in the hall 100.

Figure 3C:
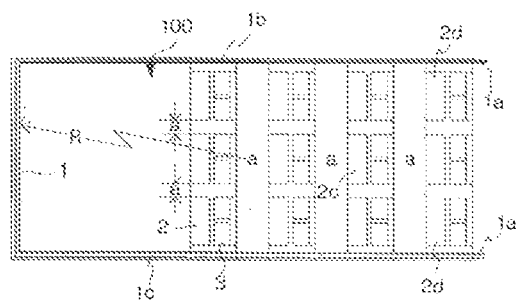
FIG. 3C is an explanatory diagram of a configuration exemplary embodiment of a ⌐-shaped screen.

As illustrated in FIG. 3C, the first screen 1 is configured on the front surface in the hall 100 in the plane and the left and right screens 1b and 1c are configured in the plane to configure the whole screen form in a ⌐-shaped form.

Figure 3D:
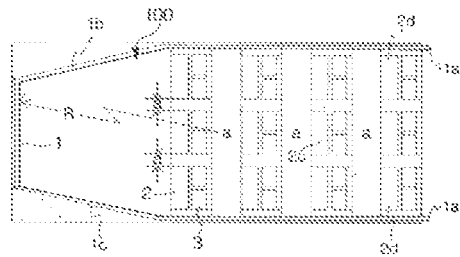
FIG. 3D is an explanatory diagram of a configuration exemplary embodiment of a polygonal screen.

As illustrated in FIG. 3D, the first screen 1 is configured on the front surface in the hall 100 in a polygonal shape and the left and right screens 1b and 1c are configured in the plane.

Figure 4:
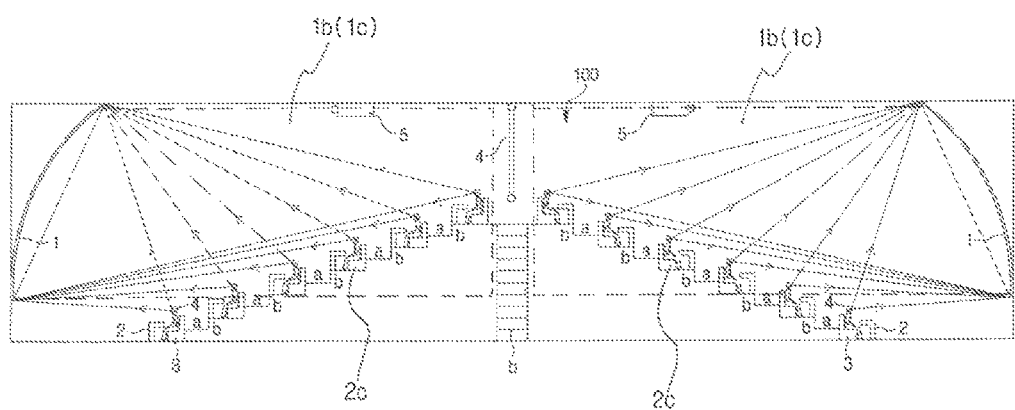
FIG. 4 illustrates a configuration exemplary embodiment configuring a structure of FIG. 1 as a symmetric structure.
Figure 5:
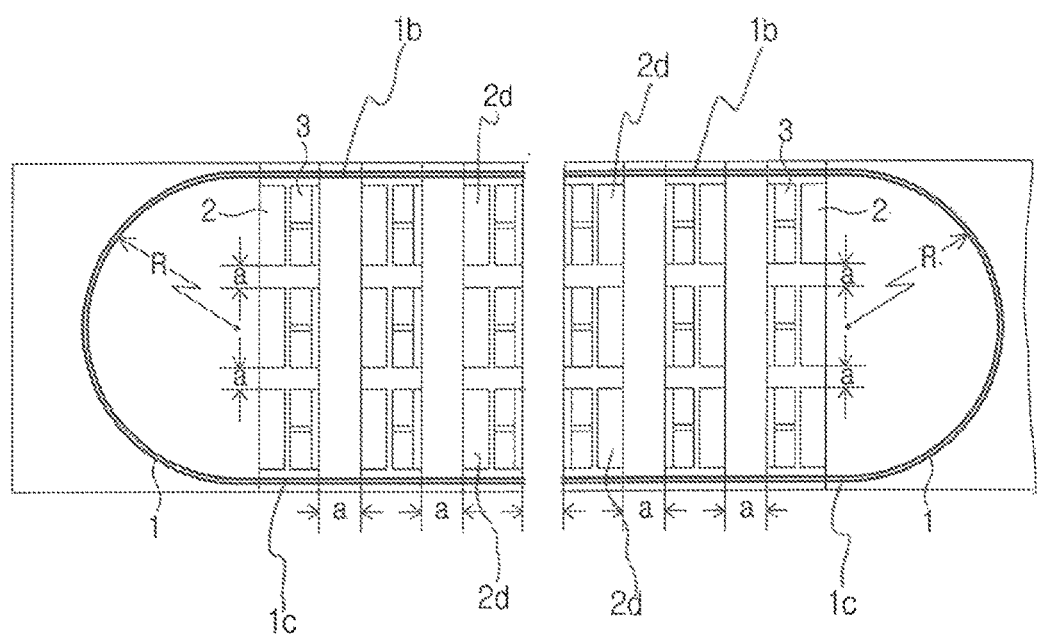
FIG. 5 is a bottom explanatory diagram of the structure of FIG. 4.

In the case of the structures of FIGS. 3A, 3B, 3C, and 3D, the whole structure of the hall 100 is configured in the symmetric structure in both front and rear directions to provide the image at a horizontal viewing angle of 200 to 360° as illustrated in FIGS. 4 and 5.

The first, second, and third screens 1, 1b, and 1c are configured and disposed to view the image at the horizontal viewing angle of 100 to 180° of the virtual reality.

The structure of the hall 100 in FIGS. 1, 2, 3A, 3B, 3C, and 3D may be configured in the symmetric structure in both the front and rear directions.

In this case, a panoramic view of the stadium of 240° may be provided while extending the horizontal viewing angle forward and backward while extending the horizontal viewing angle the front and rear sides and as necessary, the inside of the hall 100 is separated into the front and rear sides every 120° and a middle block film 4 is provided to simultaneously relay two games in one hall and enjoy cheer, and the like by separating a visiting team and a home team at both sides of the center of the hall.

Examples of the configuration of the screen described above are not limited to the above-described exemplary embodiment, but may be implemented in various forms capable of securing the virtual reality image with the horizontal viewing angle of 120° or more.

The configuration of the screen is not limited only to a projection screen. The configuration of the screen may be substituted with self-emission images including the LCD, the OLED, the LED, the micro LED, and the like. In this case, the configuration of a projector 5 is deleted.

The projector 5 divides and projects the image at a projection angle according to the type of the screen. For example, when the projection angle is configured at 40 to 60°, the projector 5 is configured as a structure constituted by 3 to 4 multiple projectors 5 to form the projection angle of 180° or more. Alternatively, the screen (1) structure of an image display structure constituted by a plurality of LEDs, an OLED, or the like may be attached to a wall surface.

Further, the structure of the first, second, and third screens 1, 1b, and 1c is configured as one structure of an LED, an LCD, an OLED, a micro LED, a flexible display, and a display displaying an image itself through autonomous emission.

As illustrated in FIG. 2, the vertical viewing angle is configured such a manner that the table and chair structures are configured in a staircase form so that the customer of the table 2 is free from visual disturbance by a customer on a front table and upper and lower surfaces of the screen 1 are all visible.

That is, a lower height installed in the hall of the screen 1 is set to 1.6 m or more, based on 1.6 m which is the sitting height of the customer at the first column and the height of the staircase b is set and configured based on 20 to 40 which is a head height of a front person.

In the case of the arrangement of the height of the seat 3 and the height of the table 2 is such that the first screen 1 is not blocked by the head of the customer from the first customer to the second customer of the chair 3, but a lower end to an upper end of the first screen 1 are viewed and the entirety of the upper and lower parts of the first screen 1 is visible, and as a result, the upper and lower viewing angles of 60° or more are ensured.

The upper and lower viewing angles of 60° of the screen are formed by configuring the vertical height of the screen so that the angle of a position determined by a distance of the table with respect to the height of the screen is 60° or more based on the viewer at a position of a reference table 2c.

Therefore, a configuration in which the seat arrangement, the arrangement of the first, second, and third screens 1, 1a, and 1b, and the staircase b are combined ensures the horizontal viewing angle of 120° or more and the vertical viewing angle of 60° or more, and as a result, sports may be enjoyed like the stadium scene.

Figure 6:
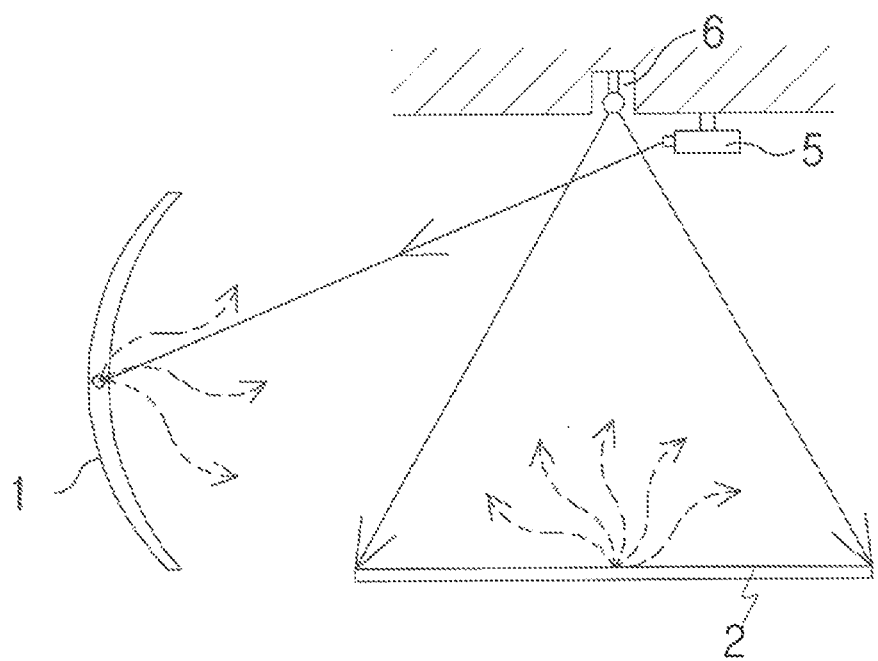
FIG. 6 is a local illumination explanatory diagram.

In order to lighten the position of the table 2 of the customer, as shown in FIG. 6, the illumination is made into a beam compared with the image projection angle of the projector 5 and configured while being buried in a ceiling to be irradiated only downward to make the brightness of the table 2 and the service passage a brighter than twice while preventing the beam from being irradiated to the first, second, and third screens 1, 1b, and 1c.

Further, the serving passage a is provided on the front surface of the table 2, that is, a rear surface or left and right side surfaces of the seat. The width of the serving passage a is appropriately equal to or more than 30 cm and less than 100 cm. In the case of the passage, the serving passage a is provided on the front surfaces of the chair 3 and the table 2 as illustrated in FIGS. 1, 2, 3A, 3b, 3C, and 3D, 4, and 5.

In other words, a structure having the same function as the seat of the stadium is configured by combining four elements such as the chair 3, the table 2, and the serving passage a and the local illumination 6 in one staircase (b) structure.

Therefore, as illustrated in FIGS. 1, 2, 3A, 3B, 3C, 3D, 4, and 5, the first screen 1 is provided on the front surface of the hall 100 and the second and third screens 1b and 1c are provided on both left and right and the multiple of tables 2 are arranged on the basis of the center table 2c positioned at the center of the first screen 1 and the center of the second and third screens 1b and 1c and the center of the hall, and a table 2d at a rear seat is also be configured within a range of both ends 1a of the screen in which horizontal lengths of the second and third screens 1b and 1c end, and as a result, the customer at the front seat and a customer at a rearmost seat may secure a viewing angle of a minimum of 100° or more.

The vertical viewing angle of 60° or more is secured by arranging the chairs 3 within the range of both ends 1a of the second and third screens 1b and 1c and arranging the chairs 3 in the staircase (b) structure.

Further, the serving passage a, the chair 3, and the table 2 are simultaneously combined in the staircase b so that the serving is frequently provided to the customer through the serving passage a.

Therefore, this virtual reality sports pub structure is not applied only to the sports broadcasting but to an e-sports game room, a VR game room, a VR restaurant, and a VR theater.

What is claimed is:

1. A virtual reality sports pub system providing a virtual reality image, comprising:
    a virtual reality screen device provided with a first, second, and third screen so as to provide a sport game image as the virtual reality image at a left and right view angle of at least 120° or more;
    at least one chair and at least one table which are arranged on a stair structure to ensure an up and down view angle of the virtual reality screen at a view angle of at least 60° or more; and
    a serving passage provided at a width of 30 cm or more on a front side of the at least one table so as to provide access for at least food to the table,
    wherein the sports game virtual reality image is viewable at the left and right view angle of at least 120° or more on the first, the second, and third screens and the up and down view angle of at least 60° or more being provided by a height of the stair structure and at the same time at least the food is servable frequently to the at least one table through the serving passage.

2. The virtual reality sports pub system of claim 1, wherein the first, second, and third screens are divided into 3 parts to be configured as one curved screen on a front surface and two plane screens at the left and right sides, respectively, to form a U-shaped screen structure.

3. The virtual reality sports pub system of claim 1, wherein the virtual reality screen device is configured symmetrically in both front and rear direction such that the image at a left and right view angle of 200° or more is provided.

4. The virtual reality sports pub system of claim 1, wherein the first, second and third screens are divided into 3 parts to be configured as one plane screen on a front surface and two plane screens at the left and right sides, respectively, to form an ⊓-shaped screen structure.

5. The virtual reality sports pub system of claim 1, wherein the first, second and third screens are configured as one of LED, LCD, OLED and micro LED, which displays the image with self-light emitting diodes.

6. The virtual reality sports pub system of claim 2, wherein the first, second and third screens are configured as one of LED, LCD, OLED and micro LED, which displays the image with self-light emitting diodes.

7. The virtual reality sports pub system of claim 3, wherein the first, second and third screens are configured as one of LED, LCD, OLED and micro LED, which displays the image with self-light emitting diodes.

8. The virtual reality sports pub system of claim 2, wherein the virtual reality screen device is configured symmetrically in both front and rear direction such that the image at a left and right view angle of 200° or more is provided.

9. The virtual reality sports pub system of claim 3, wherein the virtual reality screen device is configured symmetrically in both front and rear direction such that the image at a left and right view angle of 200° or more is provided.

10. The virtual reality sports pub system of claim 4, wherein the virtual reality screen device is configured symmetrically in both front and rear direction such that the image at a left and right view angle of 200° or more is provided.

* * * * *